(12) United States Patent
Miyoshi

(10) Patent No.: US 7,782,965 B2
(45) Date of Patent: Aug. 24, 2010

(54) RADIO TRANSMISSION DEVICE AND RADIO TRANSMISSION METHOD IN MULTI-CARRIER COMMUNICATION

(75) Inventor: Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 819 days.

(21) Appl. No.: 11/632,224

(22) PCT Filed: Jul. 4, 2005

(86) PCT No.: PCT/JP2005/012354

§ 371 (c)(1),
(2), (4) Date: Jan. 11, 2007

(87) PCT Pub. No.: WO2006/006440

PCT Pub. Date: Jan. 19, 2006

(65) Prior Publication Data

US 2007/0248176 A1    Oct. 25, 2007

(30) Foreign Application Priority Data

Jul. 14, 2004    (JP)    .............................. 2004-207197

(51) Int. Cl.
H04L 27/28    (2006.01)
(52) U.S. Cl. ..................................... 375/260
(58) Field of Classification Search ................ 375/260, 375/295, 298, 300; 714/786
See application file for complete search history.

(56) References Cited

U.S. PATENT DOCUMENTS

| | | | |
|---|---|---|---|
| 4,940,954 A | 7/1990 | Aubert et al. | |
| 7,529,315 B2 * | 5/2009 | Sudo | .......................... 375/295 |
| 2002/0163975 A1 | 11/2002 | Uesugi et al. | |
| 2003/0120995 A1 * | 6/2003 | Kim et al. | .................... 714/786 |
| 2005/0208906 A1 | 9/2005 | Miyoshi et al. | |

(Continued)

FOREIGN PATENT DOCUMENTS

JP    02141049    5/1990

(Continued)

OTHER PUBLICATIONS

PCT International Search Report dated Oct. 4, 2005.

(Continued)

*Primary Examiner*—Khai Tran
(74) *Attorney, Agent, or Firm*—Dickinson Wright PLLC

(57) ABSTRACT

There is provided a radio transmission device capable of improving the system throughput in multi-carrier communication. The device includes IQ separation units (20-1 to 20-K) for separating an I channel and a Q channel from the inputted symbol and inputting them into control units (22). The control units (22-1 to 22-K) reduce the power of the parity bit by reducing the amplitude of the channel corresponding to the parity bit among the I channel and Q channel inputted. IQ multiplexing units (24-1 to 24-K) multiplex the I channel and Q channel inputted from the control units (22-1 to 22-K) and return them to a symbol, which is inputted to an IFFT unit (26). The IFFT unit (26) subjects the symbol inputted from the IQ multiplexing units (24-1 to 24-K) to inverse fast Fourier transform (IFFT) and maps it to respective sub-carriers $f_1$ to $f_K$, thereby generating an OFDM symbol.

10 Claims, 9 Drawing Sheets

U.S. PATENT DOCUMENTS

2008/0267122 A1* 10/2008 Han et al. .................. 370/329

FOREIGN PATENT DOCUMENTS

| JP | 05276211 | 10/1993 |
|---|---|---|
| JP | 2004 129249 | 4/2002 |
| JP | 2002 171298 | 6/2002 |

OTHER PUBLICATIONS

N. Maeda, et al., "Performance of the Delay Profile Information Channel based Subcarrier Transmit Power Control Technique for OFDM/FDD Systems," IEICE Transactions, B, vol. J84-B, No. 2, pp. 205-213, Feb. 2001 with partial English translation.

* cited by examiner

RADIO TRANSMISSION DEVICE AND RADIO TRANSMISSION METHOD IN MULTI-CARRIER COMMUNICATION

TECHNICAL FIELD

The present invention relates to a radio transmitting apparatus and radio transmitting method in multicarrier communications.

BACKGROUND ART

In recent years, in radio communications—and in mobile communications in particular—various kinds of information such as images and data have become objects of transmission in addition to voice. With demand for the transmission of various kinds of content expected to grow steadily in the future, an increased need for high-speed transmission is also anticipated. However, when high-speed transmission is carried out in mobile communications, the effect of delayed waves due to multipath propagation cannot be ignored, and transmission characteristics degrade due to frequency selective fading.

Multicarrier (MC) communication methods such as OFDM (Orthogonal Frequency Division Multiplexing) are now attracting attention as one kind of technology for combating frequency selective fading. Multicarrier communication is a technology that achieves high-speed transmission by transmitting data using a plurality of carriers (subcarriers) whose transmission speed is suppressed to a level at which frequency selective fading does not occur. With the OFDM modulation method, in particular, the subcarriers on which data is placed are mutually orthogonal, making this the multicarrier modulation method offering the highest spectral efficiency. Moreover, the OFDM modulation method can be implemented with a comparatively simple hardware configuration. For these reasons, OFDM is an object of particular attention, and various related studies are being undertaken.

One example of such studies is a technology that increases system throughput by executing control so that transmission of a subcarrier with poor channel quality is not performed (see Non-patent Document 1, for example).

Non-patent Document 1: Noriyuki MAEDA, Seiichi SAMPEI, Norihiko MORINAGA, "Performance of the Delay Profile Information Channel based Subcarrier Transmit Power Control Technique for OFDM/FDD Systems" IEICE Transactions, B, Vol. J84-B, No. 2, pp. 205-213 (February 2001)

DISCLOSURE OF INVENTION

Problems to be Solved by the Invention

However, with the conventional technology, whether or not transmission is performed is decided in subcarrier units based simply on channel quality, and therefore if an important bit (such as a systematic bit in a turbo code, for example) is included in a subcarrier that is not transmitted because its channel quality is poor, that important bit is lost, and system throughput may actually fall.

It is an object of the present invention to provide a radio transmitting apparatus and radio transmitting method that enable system throughput to be increased in multicarrier communications.

Means for Solving the Problems

A radio transmitting apparatus of the present invention performs radio transmission of a multicarrier signal composed of a plurality of subcarriers, and employs a configuration that includes: a coding section that codes a transmit bit into a systematic bit and a parity bit; a modulation section that modulates the systematic bit and the parity bit to generate a symbol; a control section that reduces the power of the parity bit of the symbol; a generation section that maps the symbol onto one of the plurality of subcarriers to generate the multicarrier signal; and a transmitting section that performs radio transmission of the multicarrier signal.

Advantageous Effect of the Invention

The present invention can increase system throughput in multicarrier communications.

BEST MODE FOR CARRYING OUT THE INVENTION

Embodiments of the present invention will now be described in detail with reference to the accompanying drawings. A radio transmitting apparatus described below performs radio transmission of a multicarrier signal composed of a plurality of subcarriers, and is installed, for example, in a radio communication base station apparatus or radio communication terminal apparatus used in a mobile communication system.

Embodiment 1

Figure 1:
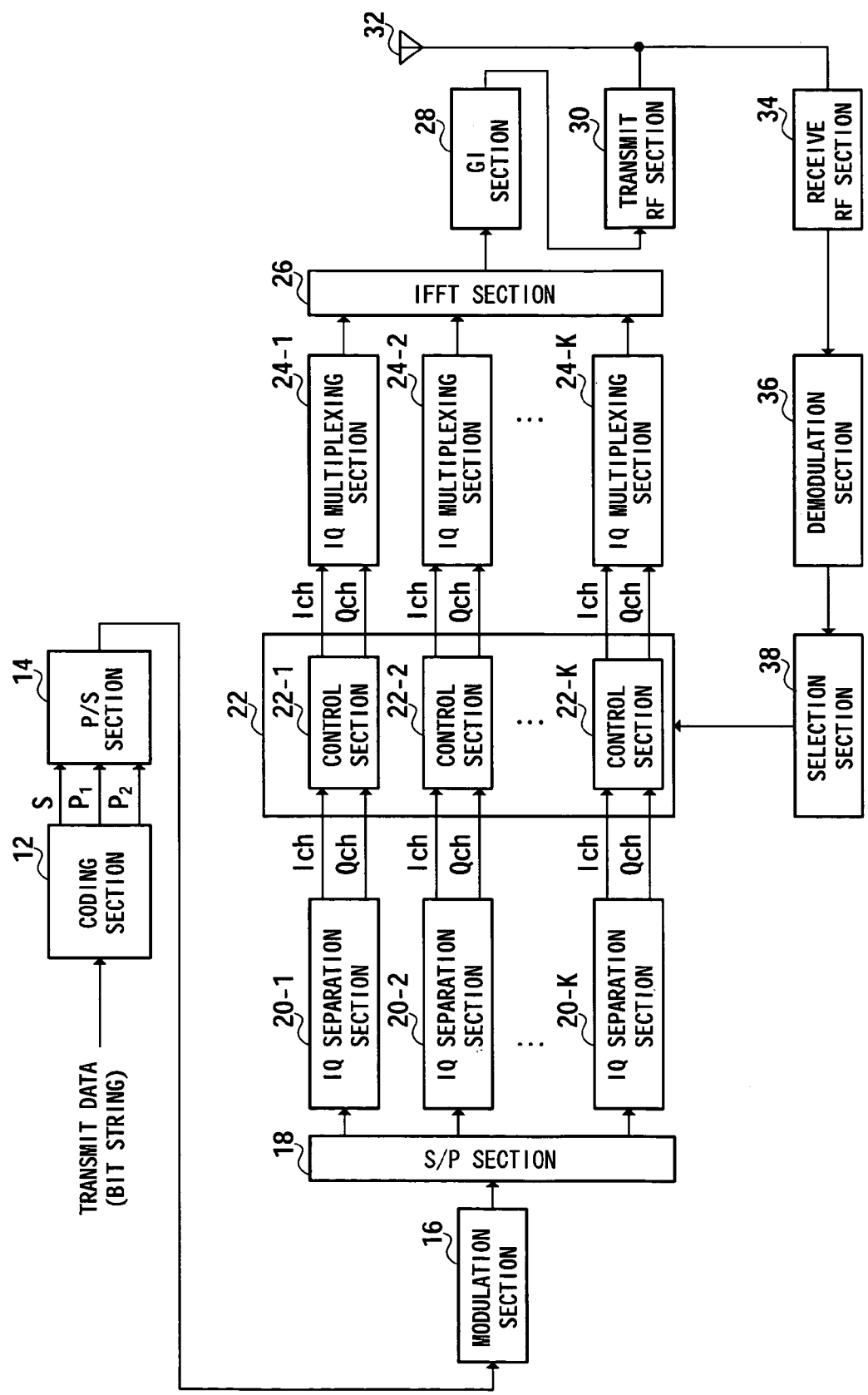
FIG. 1 is a block diagram showing the configuration of a radio transmitting apparatus according to Embodiment 1 of the present invention.

In the radio transmitting apparatus shown in FIG. 1, a coding section 12 performs error correction coding of transmit data (a bit string) using a systematic code such as a turbo code. By performing coding of the transmit bit string using a systematic code, coding section 12 performs coding into systematic bits S, which are actual transmit bits, and parity bits P, which are redundant bits. Here, it is assumed that coding rate R=⅓, and therefore one transmit bit is coded into one systematic bit S and two parity bits $P_1$ and $P_2$. Coded systematic bit S and parity bits $P_1$ and $P_2$ are input in parallel to a P/S section 14.

P/S section 14 converts a parallel-input bit string to serial form, and inputs S, $P_1$, and $P_2$ in that order to a modulation section 16.

Figure 2:
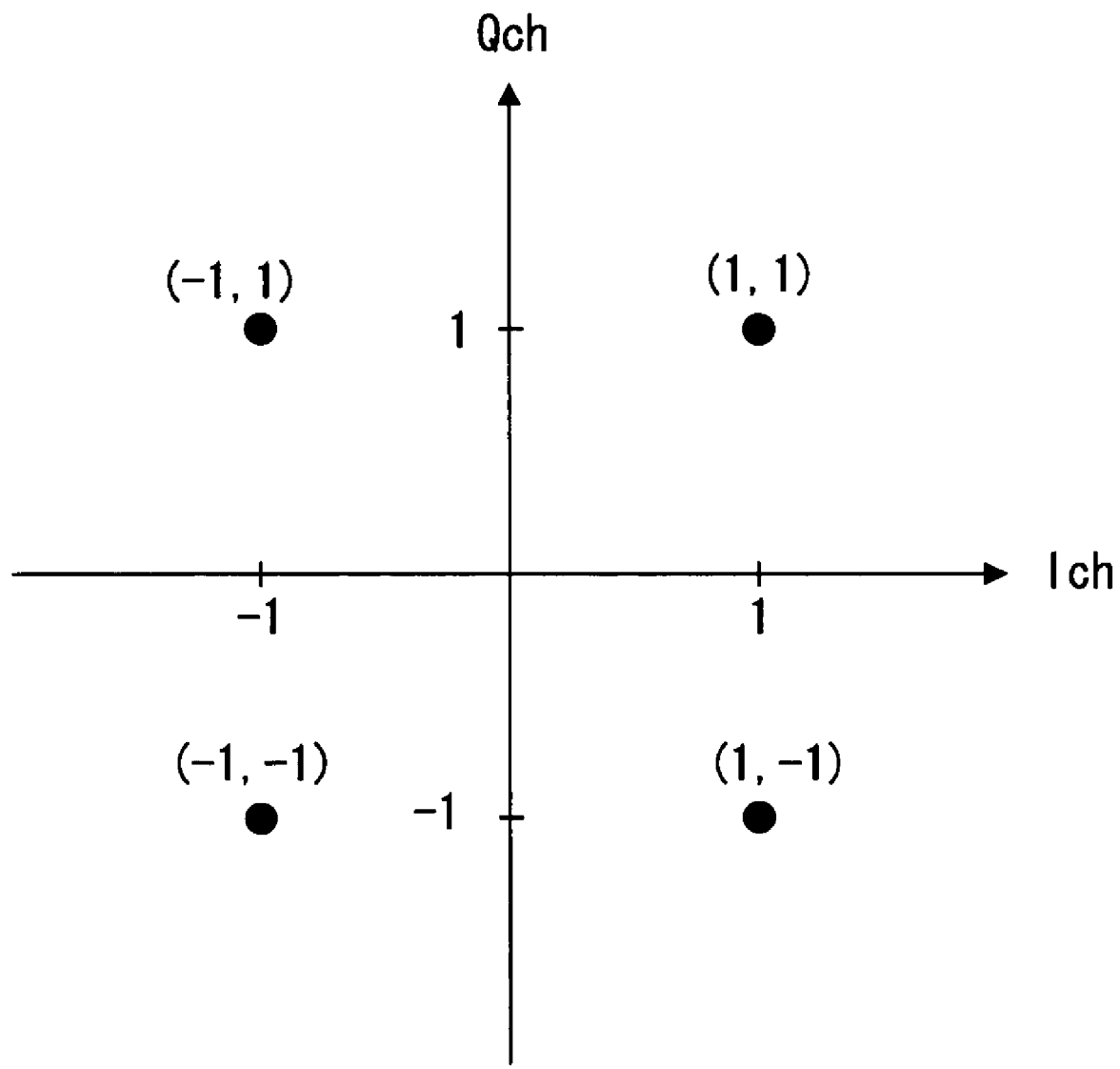
FIG. 2 is a signal point arrangement diagram according to Embodiment 1 of the present invention (before amplitude control)

Modulation section 16 performs QPSK modulation of input systematic bit S and parity bits $P_1$ and $P_2$ to generate a symbol. Modulation section 16 converts an input bit value of "0" to "1" and an input bit value of "1" to "−1" to generate one symbol for every 2 bits input successively, and places a generated symbol at one of four signal points on an orthogonal coordinate plane (IQ plane) as shown in FIG. 2. Thus, the 2 bits correspond to an I channel ($I_{ch}$) and Q channel ($Q_{ch}$) respectively. As QPSK modulation is performed by modulation section 16, generated symbol ($I_{ch}$, $Q_{ch}$) is one of (S, $P_1$), ($P_1$, $P_2$), or ($P_2$, S). The post-modulation symbol is input to an S/P section 18.

Each time symbols equivalent to K subcarriers $f_1$ through $f_K$ forming an OFDM symbol that is a multicarrier signal are serially input, S/P section 18 converts those symbols to parallel form, and inputs them to IQ separation sections 20-1 through 20-K.

IQ separation sections 20-1 through 20-K, control sections 22-1 through 22-K, and IQ multiplexing sections 24-1 through 24-K are provided corresponding to subcarriers $f_1$ through $f_K$ forming one OFDM symbol.

IQ separation sections 20-1 through 20-K separate an input symbol into an I channel and a Q channel, and input these to a control section 22. That is to say, IQ separation sections 20-1 through 20-K separate each symbol composed of 2 bits into bit units.

Control section 22 is composed of control sections 22-1 through 22-K. Control sections 22-1 through 22-K perform control to reduce the power of parity bits. Of an input I channel and Q channel, control sections 22-1 through 22-K decrease the amplitude of the channel corresponding to a parity bit, reducing the parity bit power. Also, control sections 22-1 through 22-K reduce parity bit power in accordance with the result of selection by a selection section 38 described later herein. The actual control method is described later herein. After amplitude control, the I channels and Q channels are input to IQ multiplexing sections 24-1 through 24-K.

IQ multiplexing sections 24-1 through 24-K each multiplex the input I channel and Q channel and restore the symbol, and input this to an IFFT section 26.

IFFT section 26 perform an IFFT (inverse fast Fourier transform) on the symbols input from IQ multiplexing sections 24-1 through 24-K, map these onto subcarriers $f_1$ through $f_K$ to generate an OFDM symbol.

After a guard interval has been added by a GI section 28, the OFDM symbol undergoes predetermined radio processing such as up-conversion by a transmit RF section 30, and is transmitted as a radio signal from an antenna 32 to a radio receiving apparatus (not shown).

In the radio receiving apparatus, the received power of each of subcarriers $f_1$ through $f_K$ is measured as the channel quality of each OFDM symbol subcarrier. Then the radio receiving apparatus transmits report information for reporting the received power value of each subcarrier to the radio transmitting apparatus shown in FIG. 1.

In the radio transmitting apparatus shown in FIG. 11, report information received via antenna 32 undergoes predetermined radio processing such as down-conversion by a receive RF section 34, and is then demodulated by a demodulation section 36. The demodulated report information is input to selection section 38.

Selection section 38 selects a parity bit whose power is to be reduced according to the channel quality of each of subcarriers $f_1$ through $f_K$. The selection method is described later herein.

Next, the control method used by control section 22 and the selection method used by selection section 38 will be described in detail. In the following descriptions, it is assumed that one OFDM symbol is composed of subcarriers $f_1$ through $f_{16}$ (K=16).

SELECTION EXAMPLE 1

Figure 3:
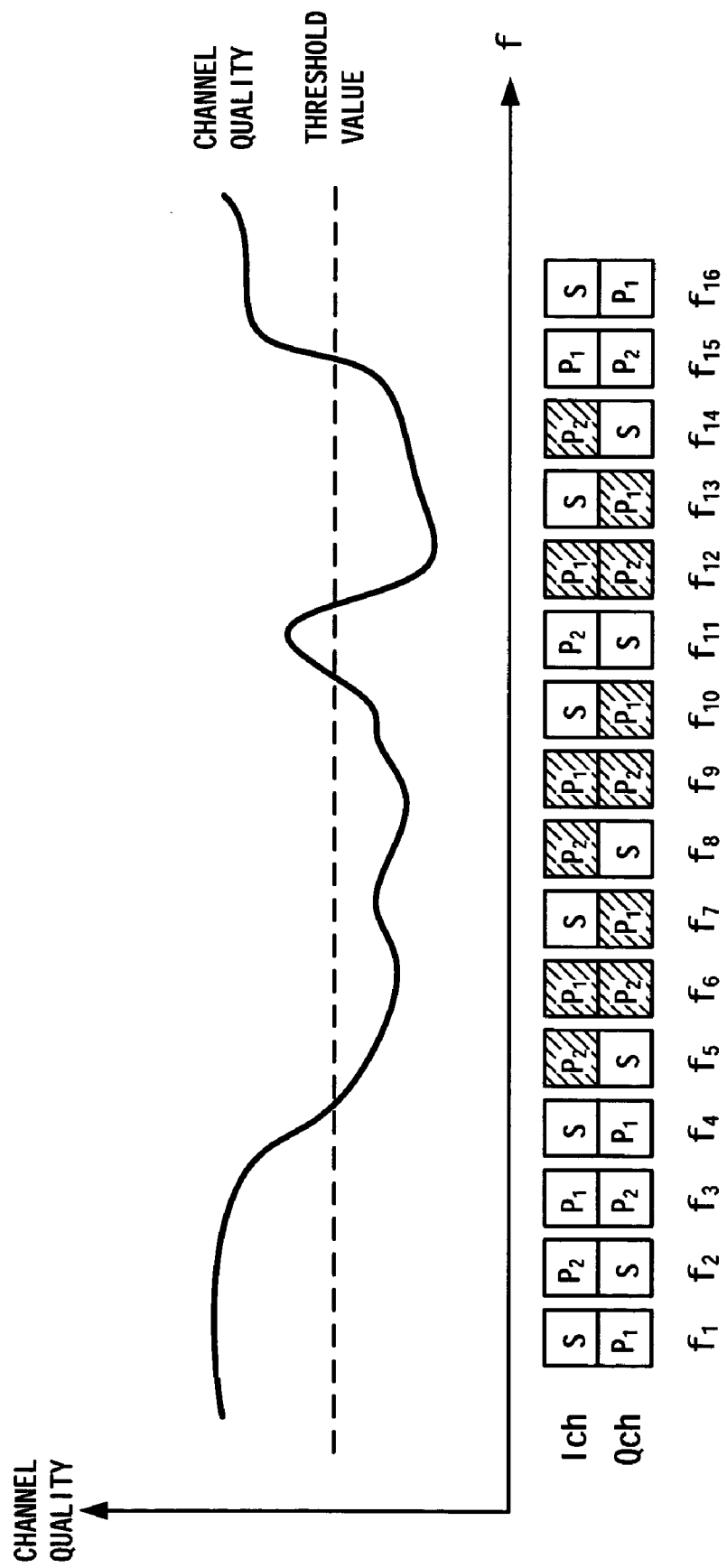
FIG. 3 is a drawing showing selection example 1 according to Embodiment 1 of the present invention.

Selection section 38 selects, as a parity bit whose power is to be reduced, a parity bit mapped onto a subcarrier from among subcarriers $f_1$ through $f_{16}$ whose channel quality is less than or equal to a threshold value. Even if a subcarrier has channel quality less than or equal to the threshold value, selection section 38 does not select a systematic bit included in the symbol mapped onto that subcarrier. For example, assume that the channel quality of each subcarrier is as shown in FIG. 3—that is to say, the channel quality of subcarriers $f_5$ through $f_{10}$ and $f_{12}$ through $f_{14}$ is less than or equal to the threshold value. In this case, selection section 38 selects only $P_2$ from among the bits contained in symbol ($P_2$, S) mapped onto subcarrier $f_5$ as a bit whose power is to be reduced. Similarly, selection section 38 selects the following as bits whose power is to be reduced: $P_1$ and $P_2$ in symbol ($P_1$, $P_2$) mapped onto subcarrier $f_6$, $P_1$ in symbol (S, $P_1$) mapped onto subcarrier $f_7$, $P_2$ in symbol ($P_2$, S) mapped onto subcarrier $f_8$, $P_1$ and $P_2$ in symbol ($P_1$, $P_2$) mapped onto subcarrier $f_9$, $P_1$ in symbol (S, $P_1$) mapped onto subcarrier $f_{10}$, $P_1$ and $P_2$ in symbol ($P_1$, $P_2$) mapped onto subcarrier $f_{12}$, $P_1$ in symbol (S, $P_1$) mapped onto subcarrier $f_{13}$, and $P_2$ in symbol ($P_2$, S) mapped onto subcarrier $f_{14}$. The selection results are input to control section 22.

The reason why selection section 38 selects a parity bit rather than a systematic bit here is as follows. Namely, when error correction coding is performed using a systematic code, a parity bit can be said to be of lower importance than a systematic bit. That is to say, in a radio receiving apparatus that receives an OFDM symbol, error rate characteristics degrade significantly if a systematic bit is lost, but predetermined error rate characteristics can be maintained even if a number of parity bits are lost. This is due to the fact that, whereas systematic bits are actual transmit bits, systematic bits are redundant bits.

I-Q separation section 20-1 corresponding to subcarrier $f_1$ separates input symbol (S, $P_1$) into I channel: S and Q channel: $P_1$, and inputs these to control section 22-1. I-Q separation section 20-2 corresponding to subcarrier $f_2$ separates input symbol ($P_2$, S) into I channel: $P_2$ and Q channel: S, and inputs these to control section 22-2. I-Q separation section 20-3 corresponding to subcarrier $f_3$ separates input symbol ($P_1$, $P_2$) into I channel: $P_1$ and Q channel: $P_2$, and inputs these to control section 22-3. In the same way, IQ separation sections 20-4 through 20-16 corresponding to subcarriers $f_4$ through $f_{16}$ separate an input symbol into an I channel and Q channel, and output these to control sections 22-4 through 22-16.

In control sections 22-1 through 22-16, parity bit power is reduced by reducing amplitude of the I channel and amplitude of the Q channel according to the selection section 38 selection results. Here, control sections 22-1 through 22-16 make the amplitude of channels corresponding to parity bits selected by selection section 38 zero. Thus, signal point placement of symbols after multiplexing by IQ multiplexing sections 24-1 through 24-16 is at one of the signal points shown in FIG. 4. That is to say, if a parity bit selected by selection section 38 corresponds to the I channel, the signal point is (0, 1) or (0, −1), and if a parity bit selected by selection section 38 corresponds to the Q channel, the signal point is (1, 0) or (−1, 0). If a parity bit selected by selection section 38 corresponds to both the I channel and the Q channel, the signal point is (0, 0). By this means, the power of a parity bit contained in a symbol mapped onto a subcarrier whose channel quality is less than or equal to the threshold value becomes 0, and as a result, that parity bit is excluded from transmission.

Figure 4:
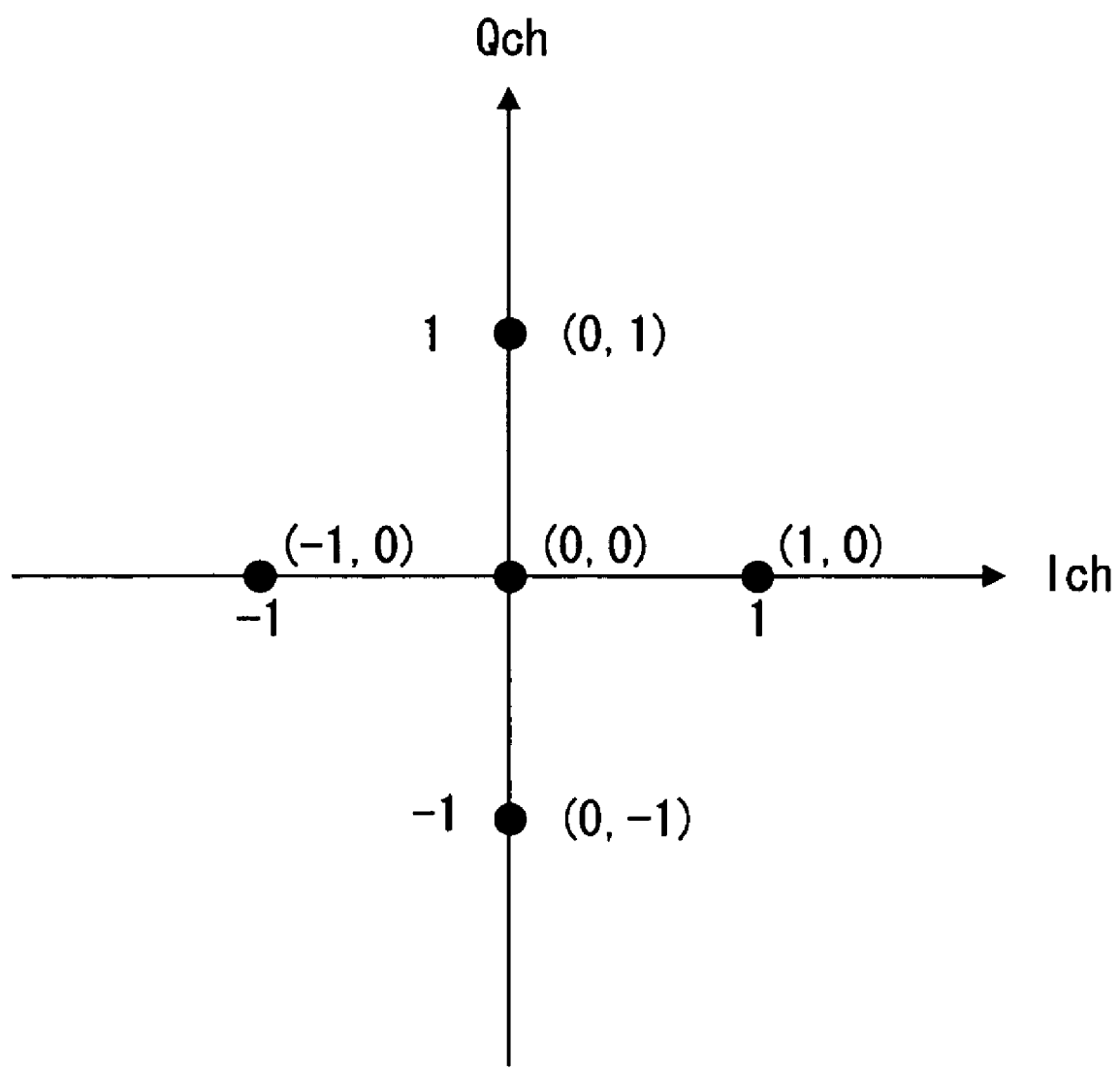
FIG. 4 is a signal point arrangement diagram according to Embodiment 1 of the present invention (after amplitude control)

For example, if symbol ($P_2$, S) mapped onto subcarrier $f_5$ shown in FIG. 3 is placed at the (1, 1) signal point in FIG. 2, the amplitude value of the I channel corresponding to $P_2$ is reduced from 1 to 0, and therefore the signal point position of the symbol after amplitude control is (0, 1) in FIG. 4. As a result, the power of $P_2$ becomes 0, and $P_2$ is excluded from transmission. Also, if symbol ($P_1$, $P_2$) mapped onto subcarrier $f_6$ is placed at the (1, 1) signal point in FIG. 2, the amplitude value of the I channel corresponding to $P_1$ and the amplitude value of the Q channel corresponding to $P_2$ are both reduced from 1 to 0, and therefore the signal point position of the symbol after amplitude control is (0, 0) in FIG. 4. As a result, the power of $P_1$ and $P_2$ becomes 0, and $P_1$ and $P_2$ are excluded from transmission. Furthermore, if symbol (S, $P_1$) mapped onto subcarrier $f_7$ is placed at the (1, 1) signal point in FIG. 2, the amplitude value of the Q channel corresponding to $P_1$ is reduced from 1 to 0, and therefore the signal point position of the symbol after amplitude control is (1, 0) in FIG. 4. As a result, the power of $P_1$ becomes 0, and $P_1$ is excluded from transmission. The same applies to subcarriers $f_8$ through $f_{10}$ and $f_{12}$ through $f_{14}$.

Thus, in this embodiment, items excluded from transmission are selected not in subcarrier units but in bit units. Also, of systematic bits and parity bits, only parity bits are selected for exclusion from transmission. Furthermore, systematic bits are always subject to transmission regardless of subcarrier channel quality.

Figure 5:
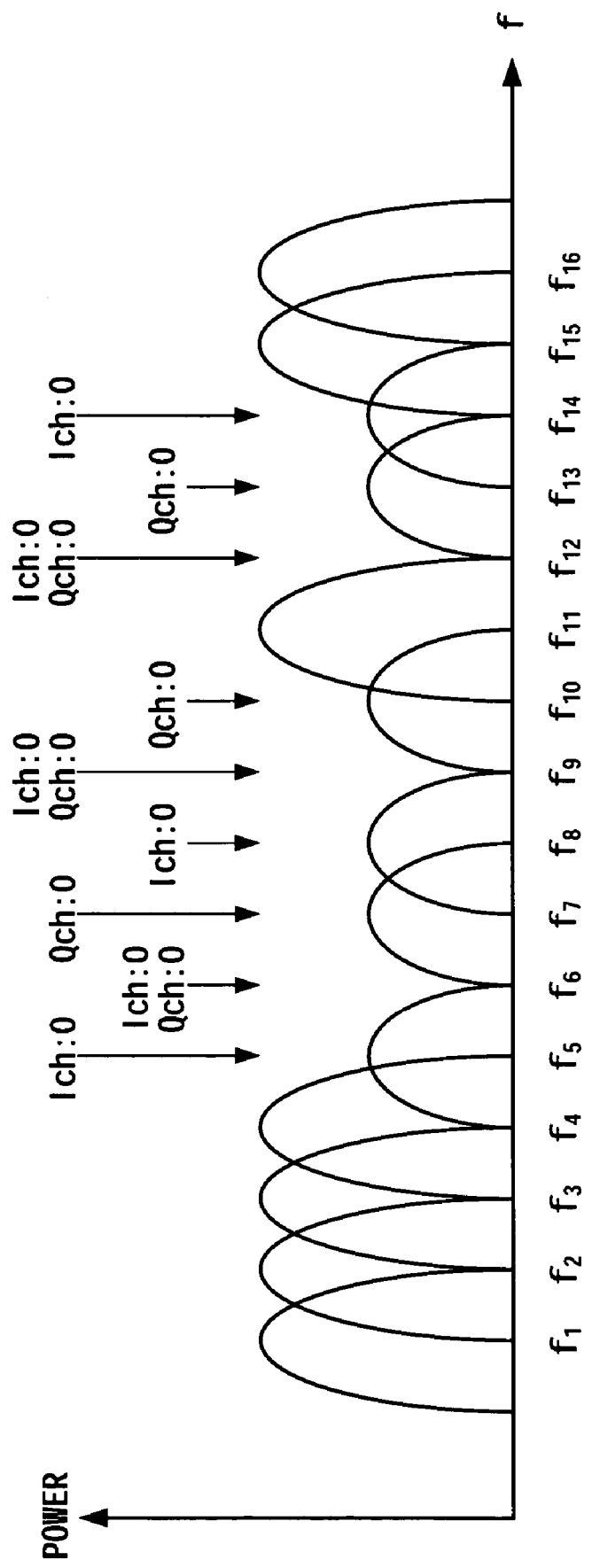
FIG. 5 is a drawing showing the power of each subcarrier according to Embodiment 1 of the present invention (selection example 1)

Through amplitude control by control sections 22-1 through 22-16 as described above, the power of OFDM symbol subcarriers $f_1$ through $f_{16}$ becomes as shown in FIG. 5. That is to say, when the amplitude of either the I channel or the Q channel is made 0, the signal point position after amplitude control is one of (1, 0), (0, 1), (−1, 0), or (0, −1), and therefore subcarrier power is half of the power prior to amplitude control. Also, when the amplitudes of both the I channel and the Q channel are made 0, the signal point position after amplitude control is (0, 0), and therefore subcarrier power is 0. Specifically, with subcarriers $f_5$, $f_8$, and $f_{14}$, the amplitude value of the I channel corresponding to $P_2$ is made 0, and $P_2$ is excluded from transmission, so that power becomes half of that prior to amplitude control. Also, with subcarriers $f_6$, $f_9$, and $f_{12}$, the amplitude value of the I channel corresponding to $P_1$ and the amplitude value of the Q channel corresponding to $P_2$ are made 0, and $P_1$ and $P_2$ are excluded from transmission, so that power becomes 0. Furthermore, with subcarriers $f_7$, $f_{10}$, and $f_{13}$, the amplitude value of the Q channel corresponding to $P_1$ is made 0, and $P_1$ is excluded from transmission, so that power becomes half of that prior to amplitude control. As a result, if the total number of bits contained in one OFDM symbol is designated $N_b$, and the number of bits excluded from transmission is designated $K_b$, the OFDM symbol power becomes $N_b/(N_b-K_b)$ times the power prior to amplitude control.

SELECTION EXAMPLE 2

Figure 6:
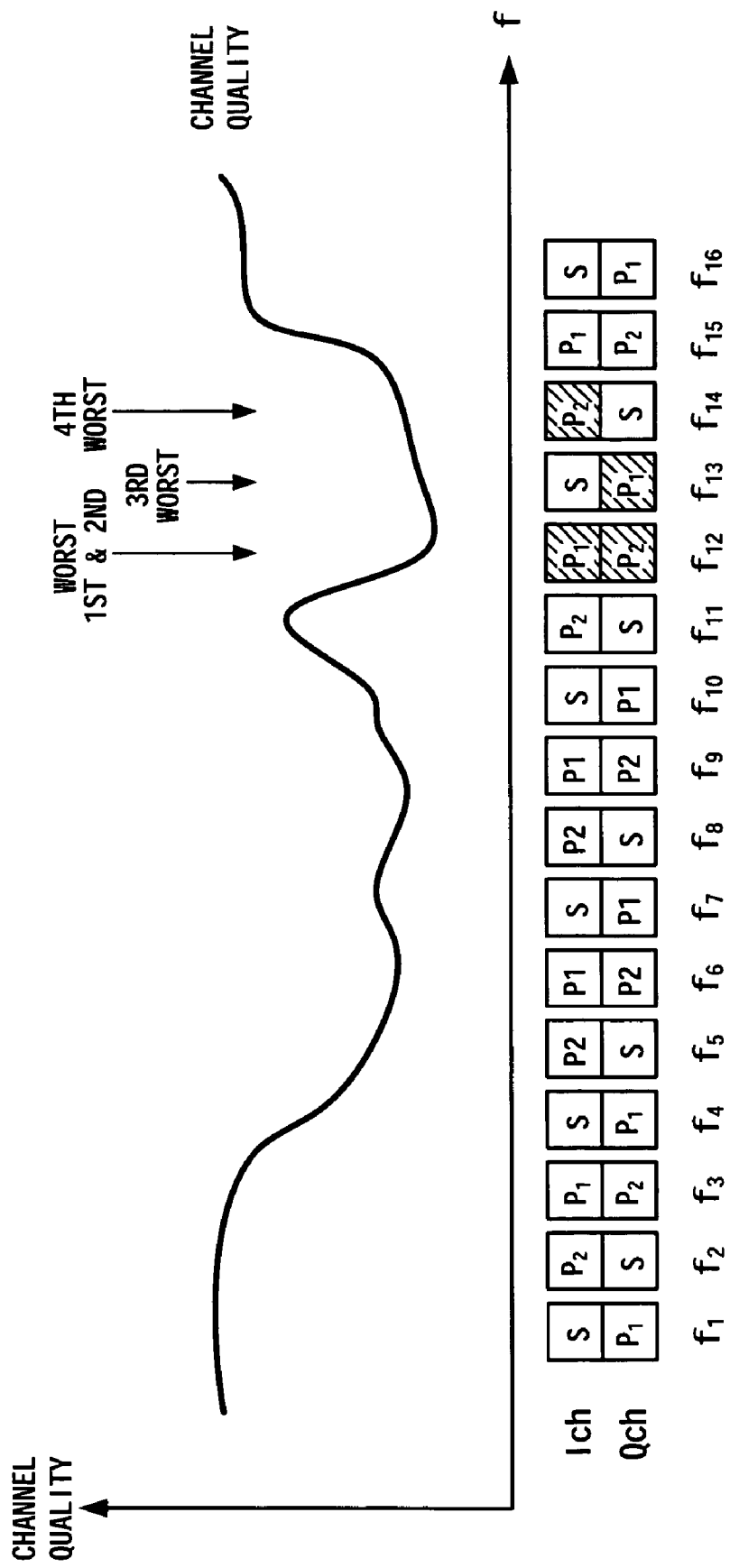
FIG. 6 is a drawing showing selection example 2 according to Embodiment 1 of the present invention.
Figure 7:
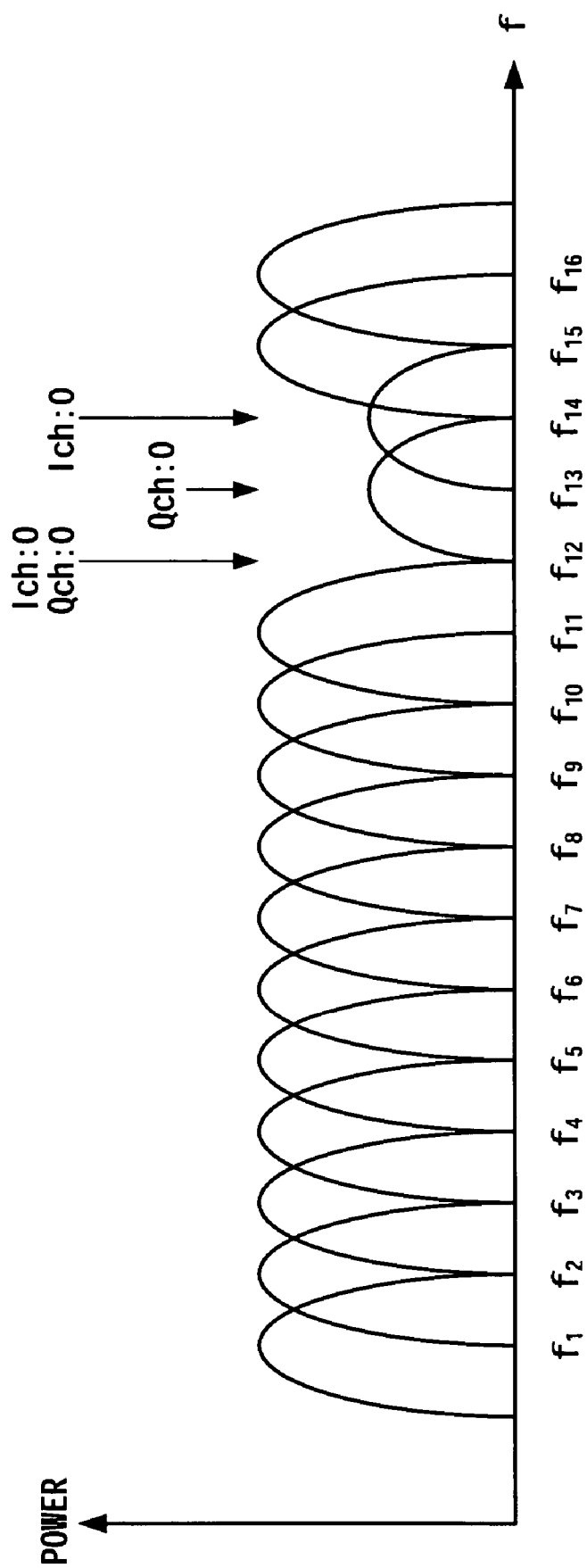
FIG. 7 is a drawing showing the power of each subcarrier according to Embodiment 1 of the present invention (selection example 2)

As parity bits whose power is to be reduced, selection section 38 selects in order from subcarriers whose channel quality is lowest among subcarriers $f_1$ through $f_{16}$, up to a predetermined number of parity bits contained in symbols mapped onto those subcarriers. For example, if the channel quality is worst for subcarriers $f_{12}$, $f_{13}$, $f_{14}$, $f_8$, $f_6$ . . . in that order (i.e. with subcarrier $f_{12}$ having the poorest channel quality), as shown in FIG. 6, selection section 38 selects up to four parity bits in the order $f_{12}$, $f_{13}$, $f_{14}$, $f_8$, $f_6$ . . . . That is to say, selection section 38 selects the four parity bits whose channel quality is worst to fourth-worst. Thus, in the example in FIG. 6, selection section 38 selects the following as parity bits whose power is to be reduced: $P_1$ and $P_2$ in symbol ($P_1$, $P_2$) mapped onto subcarrier $f_{12}$, $P_1$ in symbol (S, $P_1$) mapped onto subcarrier $f_{13}$, and $P_2$ in symbol ($P_2$, S) mapped onto subcarrier $f_{14}$. The selection results are input to control section 22. Subsequent operations are the same as in <Selection Example 1>. Thus, in this Selection Example 2, the power of OFDM symbol subcarriers $f_1$ through $f_{16}$ is as shown in FIG. 7. That is to say, with subcarrier $f_{12}$, the amplitude value of the I channel corresponding to $P_1$ and the amplitude value of the Q channel corresponding to $P_2$ are made 0, and $P_1$ and $P_2$ are excluded from transmission, so that power becomes 0. Also, with subcarrier $f_{13}$, the amplitude value of the Q channel corresponding to $P_1$ is made 0, and $P_1$ is excluded from transmission, so that power becomes half of that prior to amplitude control. Furthermore, with subcarrier $f_{14}$, the amplitude value of the I channel corresponding to $P_2$ is made 0, and $P_2$ is excluded from transmission, so that power becomes half of that prior to amplitude control.

Thus, in this embodiment, not only channel quality but also the contents of symbols mapped onto subcarriers (that is, whether systematic or parity bits) are taken into consideration in selecting items excluded from transmission. Also, in this embodiment, items excluded from transmission are selected not in subcarrier units but in bit units. Thus, according to this embodiment, even if an important bit such as a systematic bit is included in a subcarrier of poor channel quality, loss of that important bit can be prevented, and as a result, system throughput can be increased. Also, in this embodiment, since items excluded from transmission are selected not in subcarrier units but in bit units, OFDM symbol power can be controlled more precisely.

Embodiment 2

A radio transmitting apparatus according to this embodiment increases the power of a systematic bit in proportion as the power of a parity bit is reduced.

The only difference between a radio transmitting apparatus according to this embodiment and a radio transmitting apparatus according to Embodiment 1 is in the operation of control sections 22-1 through 22-16, and therefore only control sections 22-1 through 22-16 will be described in the following description. In this embodiment, a case will be described in which above <Selection Example 1> is used as a selection method.

Control sections 22-1 through 22-16 reduce parity bit power according to the selection results of selection section 38, and also increase systematic bit power in proportion as parity bit power is reduced. It is here assumed that control sections 22-1 through 22-16 make the amplitude of a channel corresponding to a parity bit selected by selection section 38 zero, and also multiply the amplitude of a channel corresponding to a systematic bit contained in the same symbol as that parity bit by a factor of $\sqrt{2}$. Thus, signal point placement of symbols after multiplexing by IQ multiplexing sections 24-1 through 24-16 is as shown in FIG. 4. That is to say, if a parity bit selected by selection section 38 corresponds to the I channel, the signal point is $(0, \sqrt{2})$ or $(0, -\sqrt{2})$ and if a parity bit selected by selection section 38 corresponds to the Q channel, the signal point is $(\sqrt{2}, 0)$ or $(-\sqrt{2}, 0)$. If a parity bit selected by selection section 38 corresponds to both the I channel and the Q channel, the signal point is $(0, 0)$. By this means, the power of a parity bit contained in a symbol mapped onto a subcarrier whose channel quality is less than or equal to a threshold value becomes 0, and the power of a systematic bit contained in the same symbol as that parity bit is doubled. Thus, the power of a subcarrier onto which both a parity bit and a systematic bit are mapped is the same before and after amplitude control.

Figure 8:
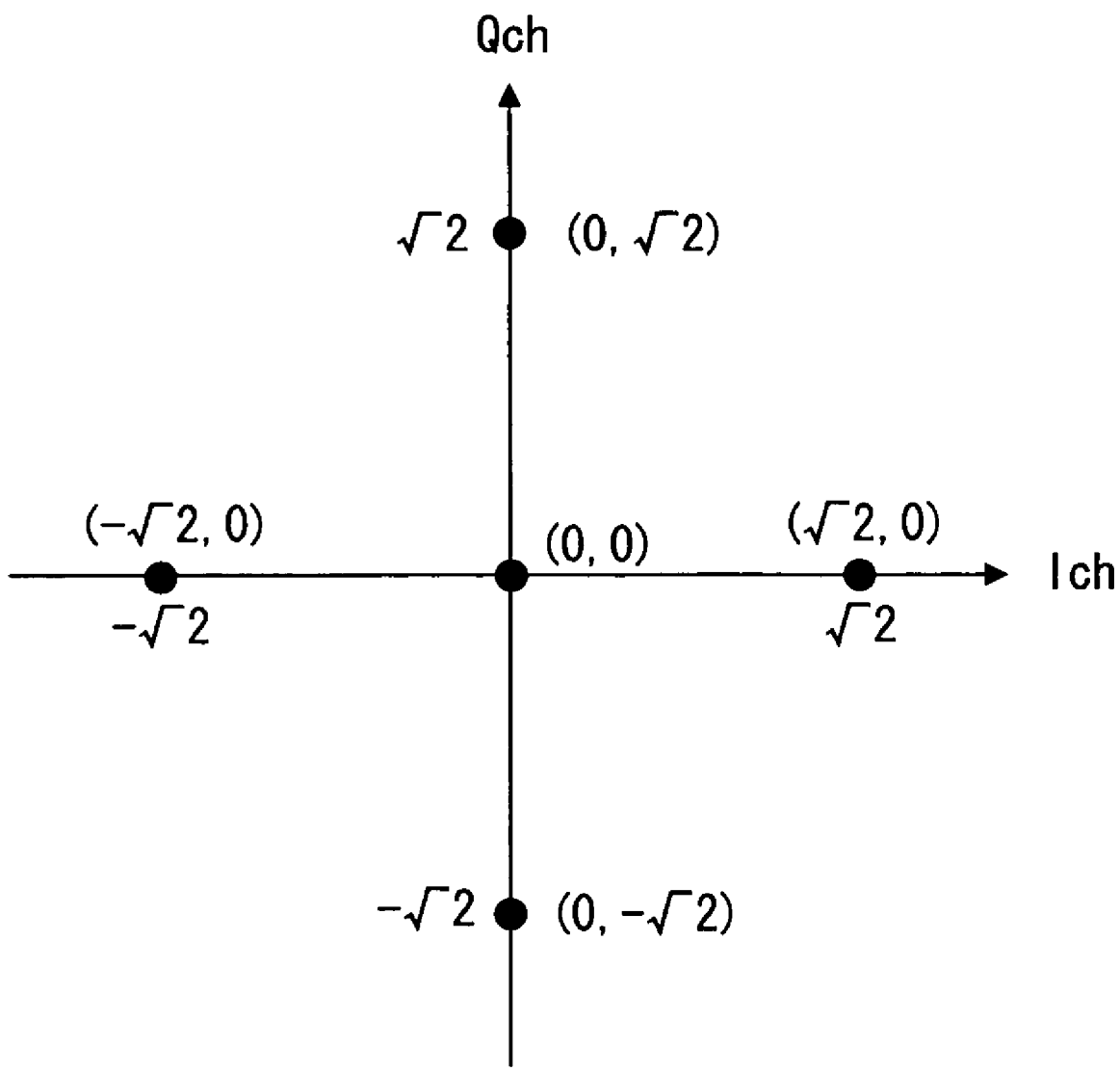
FIG. 8 is a signal point arrangement diagram according to Embodiment 2 of the present invention (after amplitude control)

For example, if symbol $(P_2, S)$ mapped onto subcarrier $f_5$ shown in FIG. 3 is placed at the $(1, 1)$ signal point in FIG. 2, the amplitude value of the I channel corresponding to $P_2$ is reduced from 1 to 0, and the amplitude value of the Q channel corresponding to S is increased from 1 to $\sqrt{2}$, and therefore the signal point position of the symbol after amplitude control is $(0, \sqrt{2})$ in FIG. 8. As a result, the power of $P_2$ becomes 0 and $P_2$ is excluded from transmission, and the power of S becomes $\sqrt{2}$, enabling the power of the systematic bit, which is the more important bit, to be increased while keeping the power of subcarrier $f_5$ constant. Also, if symbol $(P_1, P_2)$ mapped onto subcarrier $f_6$ is placed at the $(1, 1)$ signal point in FIG. 2, the amplitude value of the I channel corresponding to $P_1$ and the amplitude value of the Q channel corresponding to $P_2$ are both reduced from 1 to 0, and therefore the signal point position of the symbol after amplitude control is $(0, 0)$ in FIG. 8. As a result, the power of $P_1$ and $P_2$ becomes 0, and $P_1$ and $P_2$ are excluded from transmission. Furthermore, if symbol $(S, P_1)$ mapped onto subcarrier $f_7$ is placed at the $(1, 1)$ signal point in FIG. 2, the amplitude value of the Q channel corresponding to $P_1$ is reduced from 1 to 0, and the amplitude value of the I channel corresponding to S is increased from 1 to $\sqrt{2}$, and therefore the signal point position of the symbol after amplitude control is $(\sqrt{2}, 0)$ in FIG. 8. As a result, the power of $P_1$ becomes 0 and $P_1$ is excluded from transmission, and the power of S becomes $\sqrt{2}$, enabling the power of the systematic bit, which is the more important bit, to be increased while keeping the power of subcarrier $f_7$ constant. The same applies to subcarriers $f_8$ through $f_{10}$ and $f_{12}$ through $f_{14}$.

Figure 9:
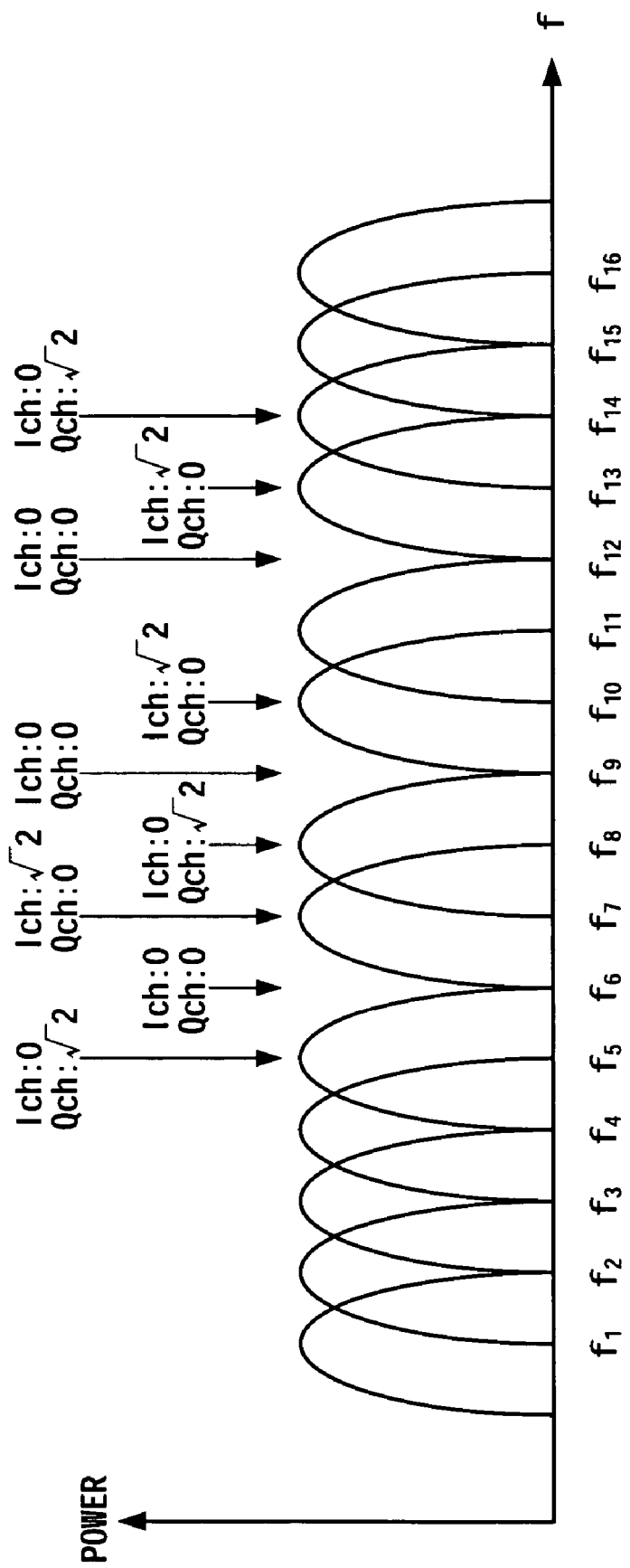
FIG. 9 is a drawing showing the power of each subcarrier according to Embodiment 2 of the present invention (selection example 1).

Through amplitude control of control sections 22-1 through 22-16 as described above, the power of OFDM symbol subcarriers $f_1$ through $f_{16}$ becomes as shown in FIG. 9. That is to say, when the amplitude of either the I channel or the Q channel is made 0, the signal point position after amplitude control is one of $(\sqrt{2}, 0)$, $(0, \sqrt{2})$ $(-\sqrt{2}, 0)$, or $(0, -\sqrt{2})$, and therefore subcarrier power is the same before and after amplitude control. Also, when the amplitudes of both the I channel and the Q channel are made 0, the signal point position after amplitude control is $(0, 0)$, and therefore subcarrier power is 0. Specifically, with subcarriers $f_5$, $f_8$, and $f_{14}$, the amplitude value of the I channel corresponding to $P_2$ is made 0 and $P_2$ is excluded from transmission, and the amplitude value of the Q channel corresponding to S is multiplied by a factor of $\sqrt{2}$, so that the power of S is doubled. As a result, the reduced amount of power of $P_2$ due to $P_2$ being excluded from transmission is assigned to S in the same symbol, and the power of subcarriers $f_5$, $f_8$, and $f_{14}$ is kept constant. Also, with subcarriers $f_6$, $f_9$, and $f_{12}$, the amplitude value of the I channel corresponding to $P_1$ and the amplitude value of the Q channel corresponding to $P_2$ are made 0, and $P_1$ and $P_2$ are excluded from transmission, so that power becomes 0. Furthermore, with subcarriers $f_7$, $f_{10}$, and $f_{13}$, the amplitude value of the Q channel corresponding to $P_1$ is made 0 and $P_1$ is excluded from transmission, and the amplitude value of the I channel corresponding to S is multiplied by a factor of $\sqrt{2}$, so that the power of S is doubled. As a result, the reduced amount of power of $P_1$ due to $P_1$ being excluded from transmission is assigned to S, and the power of subcarriers $f_7$, $f_{10}$, and $f_{13}$ is kept constant. Thus, OFDM symbol power is reduced only to the extent that the power of subcarriers $f_6$, $f_9$, and $f_{12}$ is reduced.

Thus, according to this embodiment, the power of a systematic bit is increased in proportion as the power of a parity bit is reduced, enabling the power of a systematic bit, which is the more important bit, to be increased without increasing the power of an OFDM symbol. Thus, according to this embodiment, the error rate in a radio receiving apparatus can be reduced without increasing OFDM symbol power.

Another possible example of a selection method used by selection section 38 is selection of a parity bit contained in a symbol mapped onto a subcarrier at a predetermined level or below from a channel quality average value or maximum value.

In the above embodiments, a radio communication base station may be indicated by "Node B," a radio communication terminal apparatus by "UE," and a subcarrier by "tone."

The function blocks used in the descriptions of the above embodiments are typically implemented as LSIs, which are integrated circuits. These may be implemented individually as single chips, or a single chip may incorporate some or all of them.

Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The adaptation of biotechnology or the like is also a possibility.

The present application is based on Japanese Patent Application No. 2004-207197 filed on Jul. 14, 2004, entire content of which is expressly incorporated herein by reference.

INDUSTRIAL APPLICABILITY

The present invention is suitable for use in a radio communication base station apparatus, radio communication terminal apparatus, or the like, used in a mobile communication system.

The invention claimed is:

1. A radio transmitting apparatus that performs radio transmission of a multicarrier signal composed of a plurality of subcarriers, the radio transmitting apparatus comprising:
   a coding section that codes a transmit bit into a systematic bit and a parity bit;
   a modulation section that modulates the systematic bit and the parity bit to generate a symbol;

a selection section that, according to channel quality, selects the parity bit whose power is to be reduced;

a control section that reduces power of the parity bit of the symbol;

a generation section that maps the symbol onto one of the plurality of subcarriers to generate the multicarrier signal; and a transmitting section that performs radio transmission of the multicarrier signal.

2. The radio transmitting apparatus according to claim 1, wherein the control section increases power of the systematic bit of the symbol in proportion as the power of the parity bit of the symbol is reduced.

3. A radio communication base station apparatus comprising the radio transmitting apparatus according to claim 1.

4. A radio communication terminal apparatus comprising the radio transmitting apparatus according to claim 1.

5. A radio transmitting apparatus that performs radio transmission of a multicarrier signal composed of a plurality of subcarriers, the radio transmitting apparatus comprising:

a coding section that codes a transmit bit into a systematic bit and a parity bit;

a modulation section that modulates the systematic bit and the parity bit to generate a symbol;

a separation section that separates the symbol into an I channel and a Q channel;

a control section that reduces power of the parity bit of the symbol;

a generation section that maps the symbol onto one of the plurality of subcarriers to generate the multicarrier signal; and a transmitting section that performs radio transmission of the multicarrier signal, wherein:

the control section reduces the power of the parity bit by reducing amplitude of the I channel or amplitude of the Q channel.

6. The radio transmitting apparatus according to claim 5, wherein the control section increases power of the systematic bit of the symbol in proportion as the power of the parity bit of the symbol is reduced.

7. A radio communication base station apparatus comprising the radio transmitting apparatus according to claim 5.

8. A radio communication terminal apparatus comprising the radio transmitting apparatus according to claim 5.

9. A radio transmitting method for performing radio transmission of a multicarrier signal composed of a plurality of subcarriers, the method comprising the steps of:
   (a) coding a transmit bit into a systematic bit and a parity bit;
   (b) modulating the systematic bit and the parity bit to generate a symbol;
   (c) employing a selector to select the parity bit whose power is to be reduced according to channel quality;
   (d) reducing power of the parity bit of the symbol;
   (e) mapping the symbol onto one of the plurality of subcarriers to generate the multicarrier signal; and
   (f) performing radio transmission of the multicarrier signal.

10. A radio transmitting method for performing radio transmission of a multicarrier signal composed of a plurality of subcarriers, the method comprising the steps of:
   (a) coding a transmit bit into a systematic bit and a parity bit;
   (b) modulating the systematic bit and the parity bit to generate a symbol;
   (c) separating the symbol into an I channel and a Q channel;
   (d) reducing power of the parity bit of the symbol;
   (e) mapping the symbol onto one of the plurality of subcarriers to generate the multicarrier signal; and
   (f) performing radio transmission of the multicarrier signal, wherein:
   in step (d), using a power controller, reducing the power of the parity bit by reducing amplitude of the I channel or amplitude of the Q channel.

* * * * *